(12) United States Patent
Perez et al.

(10) Patent No.: US 11,113,670 B2
(45) Date of Patent: Sep. 7, 2021

(54) SYSTEM AND METHOD FOR AUTOMATIC PROCESS ERROR DETECTION AND CORRECTION

(71) Applicant: Conduent Business Services, LLC, Dallas, TX (US)

(72) Inventors: Julien Perez, Grenoble (FR); Tomi Viljam Silander, Grenoble (FR); Adrian Corneliu Mos, Meylan (FR)

(73) Assignee: CONDUENT BUSINESS SERVICES, LLC, Dallas, TX (US)

( * ) Notice: Subject to any disclaimer, the term of this patent is extended or adjusted under 35 U.S.C. 154(b) by 250 days.

(21) Appl. No.: 15/477,825

(22) Filed: Apr. 3, 2017

(65) Prior Publication Data

US 2018/0285819 A1 Oct. 4, 2018

(51) Int. Cl.
*G06Q 10/10* (2012.01)
*H04L 12/58* (2006.01)

(52) U.S. Cl.
CPC .......... *G06Q 10/107* (2013.01); *H04L 51/02* (2013.01); *H04L 51/16* (2013.01); *H04L 51/28* (2013.01)

(58) Field of Classification Search
CPC ............ G06F 11/3072; G06F 17/2785; G06F 16/5846; G06Q 10/107; G06Q 10/10; H04L 51/18; H04L 51/12; H04L 51/28; H04L 51/36; H04L 51/14
See application file for complete search history.

(56) References Cited

U.S. PATENT DOCUMENTS

| | | | |
|---|---|---|---|
| 8,639,552 B1* | 1/2014 | Chen | G06F 9/4881 705/7.21 |
| 9,531,607 B1* | 12/2016 | Pai | H04L 43/08 |
| 10,263,946 B2* | 4/2019 | Fehling | G06Q 10/107 |
| 10,540,610 B1* | 1/2020 | Yang | G06N 20/00 |
| 2002/0065891 A1* | 5/2002 | Malik | H04L 61/1564 709/206 |
| 2004/0019537 A1* | 1/2004 | Luo | G06Q 10/087 705/28 |
| 2004/0098311 A1* | 5/2004 | Nair | G06Q 30/0601 705/26.1 |
| 2004/0177271 A1* | 9/2004 | Arnold | G06Q 10/107 713/154 |
| 2006/0100995 A1* | 5/2006 | Albornoz | G06F 16/958 |
| 2007/0186214 A1* | 8/2007 | Morgan | G06F 9/485 718/100 |
| 2009/0157650 A1* | 6/2009 | Chow | G06F 16/972 |

(Continued)

*Primary Examiner* — Kamal B Divecha
*Assistant Examiner* — Alex H. Tran

(57) ABSTRACT

A method and apparatus for detecting an error in a business process via an exchange of email messages. In one example, the method may be executed by a processor of a business process analysis server (BPAS). For example, the method includes receiving an email, wherein the email includes an address of the BPAS, analyzing the email to determine at least one feature, determining the business process based on the at least one feature, determining one or more variables that is associated with the business process, detecting the error in the business process associated with the email based on at least variable of the one or more variables associated with the business process and generating an alert email in response to the error that is detected, wherein the alert email requests a correction to the at least one variable to complete the business process.

12 Claims, 4 Drawing Sheets

(56) References Cited

U.S. PATENT DOCUMENTS

| | | | | |
|---|---|---|---|---|
| 2010/0017194 A1* | 1/2010 | Hammer | G06F 40/30 | 704/9 |
| 2011/0302251 A1* | 12/2011 | Meunier | G06F 15/16 | 709/206 |
| 2012/0158860 A1* | 6/2012 | Chakra | H04L 51/28 | 709/206 |
| 2014/0304614 A1* | 10/2014 | McAlear | G06F 3/04842 | 715/752 |
| 2015/0081803 A1* | 3/2015 | Dick | H04L 51/18 | 709/206 |
| 2015/0142896 A1* | 5/2015 | Buchanan | H04L 51/02 | 709/206 |
| 2016/0034571 A1* | 2/2016 | Setayesh | G06F 16/353 | 707/738 |
| 2017/0236060 A1* | 8/2017 | Ignatyev | G06N 20/00 | 706/46 |

\* cited by examiner

Date: Tue, 12 Sep 2000 08:35:00 - 0700 (PDT)
From: sally.beck@company.com
To: david.delainey@company.com, john.lavorato@company.com
Subject: Meeting in San Antonio - September 13-15
CC: steve.jackson@company.com, bob.hall@company.com, leslie.reeves@company.com, stacey.white@company.com, michael.moscoso@company.com, david.maxwell@company.com
BCC: BPAS@company.com I will be in San Antonio attending an offsite meeting hosted by Rick Causey on Wednesday and Thursday, September 13 through 15. I will leave the offsite meeting before its conclusion on Friday, so that I can attend a lunch meeting with Phillippe Bibi, Rick Buy, Ted Murphy and Bill Bradford to discuss common needs around risk systems. I will be in the office the afternoon of September 15. Patti Thompson, my assistant (x39106), will have telephone numbers where I can be reached. Key contacts while I am out are listed below:

Natural Gas Operations
Steve Jackson x37070
Bob Hall x36956
Leslie Reeves x37962

FIG. 2

SYSTEM AND METHOD FOR AUTOMATIC
PROCESS ERROR DETECTION AND
CORRECTION

The present disclosure relates generally to process monitoring and, more particularly, to a system and method for automatic process error detection, correction and compliance management.

BACKGROUND

Businesses execute various different processes every day. Preventing errors or properly executing these different processes may be important for efficient operation of the business.

Some businesses have implemented automatic business process management (BPM) strategies or engines that include process monitoring. However, some of today's business process execution strategies rely heavily on human-to-human conversational interactions. Some of the BPM engines may not be able to control all of the human-to-human interactions as they may use tools outside their control.

In addition, some BPM engines use messages that are exchanged directly with a user where the user is supposed to reply back with some information. The operation of the BPM engine may feel like a separate process to the user. In other words, the BPM engine may not be part of a natural conversation stream of a business process in which the users are currently engaged. As a result, users may not bother with responding to the separate messages which may make it difficult for the BPM engine to monitor business processes.

SUMMARY

According to aspects illustrated herein, there are provided a method, non-transitory computer readable medium and apparatus for detecting an error in a business process via an exchange of email messages. One disclosed feature of the embodiments is a method executed by a processor of a business processor analysis server (BPAS) that receives an email, wherein the email includes an address of the BPAS, analyzes the email to determine at least one feature, determines the business process based on the at least one feature, determines one or more variables that is associated with the business process, detects the error in the business process associated with the email based on at least variable of the one or more variables associated with the business process and generates an alert email in response to the error that is detected, wherein the alert email requests a correction to the at least one variable to complete the business process.

Another disclosed feature of the embodiments is a non-transitory computer-readable medium having stored thereon a plurality of instructions, the plurality of instructions including instructions which, when executed by a processor of the BPAS, cause the processor to perform operations that receive an email, wherein the email includes an address of the BPAS, analyze the email to determine at least one feature, determines the business process based on the at least one feature, determine one or more variables that is associated with the business process, detect the error in the business process associated with the email based on at least variable of the one or more variables associated with the business process and generate an alert email in response to the error that is detected, wherein the alert email requests a correction to the at least one variable to complete the business process.

Another disclosed feature of the embodiments is an apparatus comprising a processor and a computer-readable medium storing a plurality of instructions which, when executed by the processor, cause the processor to perform operations that receive an email, wherein the email includes an address of the BPAS, analyze the email to determine at least one feature, determines the business process based on the at least one feature, determine one or more variables that is associated with the business process, detect the error in the business process associated with the email based on at least variable of the one or more variables associated with the business process and generate an alert email in response to the error that is detected, wherein the alert email requests a correction to the at least one variable to complete the business process.

BRIEF DESCRIPTION OF THE DRAWINGS

The teaching of the present disclosure can be readily understood by considering the following detailed description in conjunction with the accompanying drawings, in which:

FIG. 2 illustrates an example email of the present disclosure;

To facilitate understanding, identical reference numerals have been used, where possible, to designate identical elements that are common to the figures.

DETAILED DESCRIPTION

The present disclosure broadly discloses a system and method for detecting an error in a business process via an exchange of email messages. As discussed above, some businesses have implemented automatic business process management (BPM) strategies or engines that deal with process monitoring. However, some of today's business monitoring strategies rely heavily on human-to-human conversational interactions. Some of the BPM engines may not be able to control all of the human-to-human interactions.

In addition, some BPM engines use messages that are exchanged directly with a user where the user is supposed to reply back with some information. The operation of the BPM engine may feel like a separate process to the user. In other words, the BPM engine may not be part of a natural conversation stream of a business process in which the users are currently engaged. As a result, users may not bother with responding to the separate messages which may make it difficult for the BPM engine to monitor business processes.

The embodiments of the present disclosure provide an improvement to existing BPM approaches by integrating itself into an email exchange, system or program. As a result, all emails may be routed to a business process analysis server (BPAS) that may analyze the emails to monitor the identified business process and detect any errors within the business process. The BPAS may be transparent to the employees or users within an enterprise as the emails may be generated automatically with an address to the BPAS or the emails may be automatically routed to the BPAS by an email exchange server. As a result, the present disclosure may provide an efficient and seamless system and method for providing business method monitoring and error detection via emails.

Figure 1:
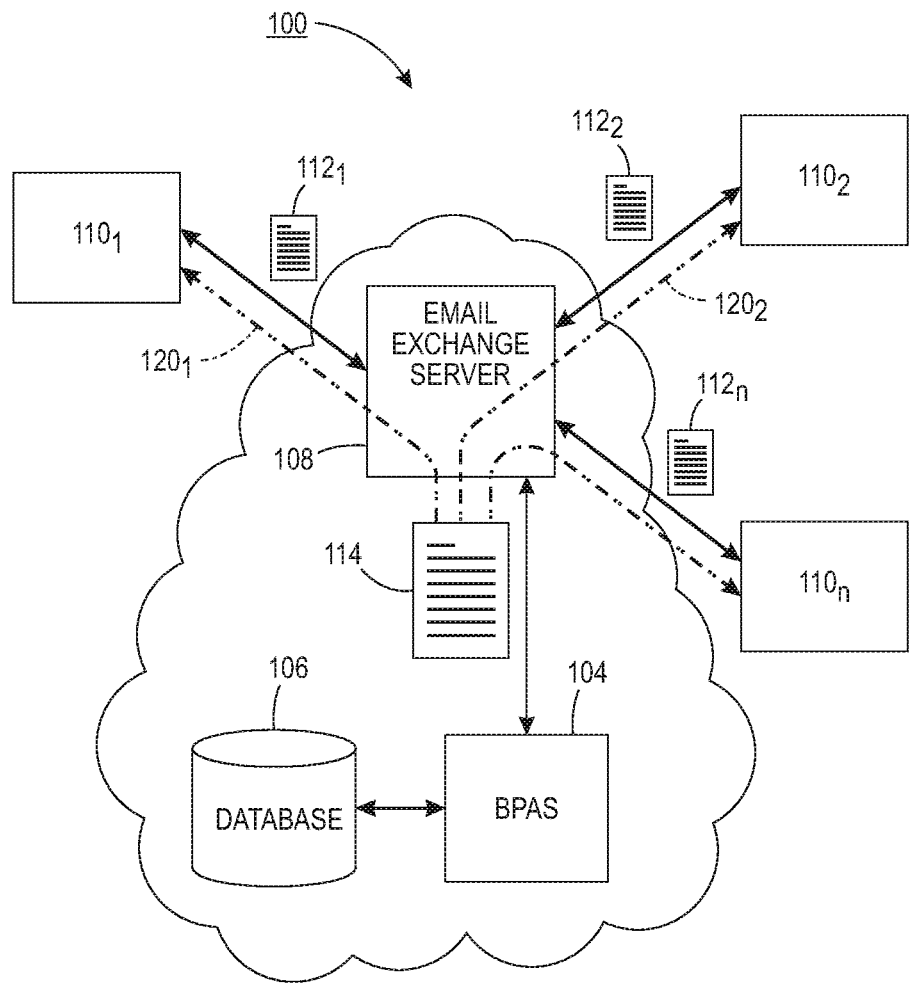
FIG. 1 illustrates an example system of the present disclosure.

FIG. 1 illustrates an example system 100 of the present disclosure. In one example, the system 100 may include a communication network 102. The communication network 102 may be any type of Internet protocol (IP) network. The communication network 102 may be a wide area network (WAN) or a local area network (LAN). The communication network 102 may provide communication over a wired or wireless connection.

The communication network 102 has been simplified for ease of explanation. The communication network 102 may include additional network elements or access networks that are not shown, such as for example, a gateway, a route, a switch, a firewall, a cellular access network, a broadband access network and the like.

In one embodiment, the communications network 102 may include a business process analysis server (BPAS) 104 and a database (DB) 106. The BPAS 104 may include a processor and computer readable memory. The computer readable memory may store instructions that are executed by the processor to perform the functions described herein.

In one embodiment, the DB 106 may store emails $112_1$ to $112_n$ (herein also referred to individual as an email 112 or collectively as emails 112, a thread of emails 112, or email thread 112) that are generated within the system 100. The DB 106 may also store pre-defined business processes that are each associated with a respective set of features and variables, as discussed in further detail below. The DB 106 may also store a company directory that stores names, contact information, email addresses, roles, and the like, of each employee or person within the company. The company directory can be used to determine the roles of parties within an email to help identify a business process associated with an email, as discussed in further detail below.

In one embodiment, the communication network 102 may also include an email exchange server 108. The email exchange server 108 may be optional and may be used to help route the emails 112 to the appropriate destination. In one embodiment, the email exchange server 108 may be used to automatically route all emails to the BPAS 104 for analysis if the address of the BPAS 104 is not automatically included when the email message is generated.

In one embodiment, the system 100 may include one or more endpoint devices $110_1$ to $110_n$ (herein also referred to individually as an endpoint device 110 or collectively as endpoint devices 110). The endpoint devices 110 may be operated by users to generate, transmit and receive the emails 112. The endpoint devices 110 may be any type of endpoint device that can be configured to generate, transmit and receive the emails 112 and communicate over the communication network 102 via a wired or wireless connection. For example, the endpoint devices 110 may be a desktop computer, a laptop computer, a tablet computer, a smartphone, and the like.

In one embodiment, the entire system 100 may be located within a single location of a company or enterprise. In another embodiment, the system 100 may be distributed over different geographic locations. For example, the endpoint devices $110_1$ to $110_n$ may each be located at different geographic locations and the DB 106, the BPAS 104 and the email exchange server 108 may be located remotely from the endpoint devices $110_1$ to $110_n$.

In one embodiment, the system 100 may be deployed to automatically monitor business processes and detect errors in the business processes using the emails 112. In one embodiment, in response to detecting an error, the BPAS 104 may automatically generate an alert email 114 that can be transmitted to one or more of the endpoint devices $110_1$ to $110_n$. The alert email 114 may request a correction to the error detected in the business process. For example, the correction may include providing additional information, correcting erroneous information, providing recommendations, and the like.

FIG. 2 illustrates an example email 112 that may be analyzed by the BPAS 104. In one embodiment, when an endpoint device 110 creates a new email, the address (e.g., an email address) of the BPAS 104 may be automatically added to the email 112. For example, an email program on the endpoint device 110 may be modified to automatically include the address to the BPAS 104 to every new email (e.g., an original email, a reply email, a forwarding email, and the like) that is created. As a result, the user of the endpoint device 110 may not have to worry about remembering to manually add the address of the BPAS 104. In one embodiment, the address to the BPAS 104 may be added in a carbon copy (CC) field 222 or in a blind carbon copy (BCC) field 224 of the email 112.

In another embodiment, the email 112 may be routed by the optional email exchange server 108. For example, the BPAS 104 may be integrated to work with the email exchange server 108. The email 112 may not include an address to the BPAS 104. Rather, the email 112 may be automatically routed by the email exchange server 108 (e.g., by adding the address of the BPAS 104 by the email exchange server 108) to the BPAS 104 for analysis before being routed to a recipient. In another embodiment, the email exchange server 108 may generate a copy of the email 112 and forward the email 112 to the recipient and the copy of the email 112 to the BPAS 104 for analysis.

In one embodiment, the BPAS 104 may analyze the emails to detect one or more features. The features may be used by a process detector to determine the business process that is being executed. In one embodiment, the process detector may be a module stored in computer readable memory and executed by a processor of the BPAS 104.

In one embodiment, the feature maybe a keyword detected within a subject field 220 using a natural language processor. For example, the email 112 may have a subject of "Meeting in San Antonio" in the subject field 220. Thus, the BPAS 104 may determine that the business process is a meeting.

In another embodiment, the business process may not be clearly articulated and a process detector may be used to determine the business process based on one or more features. In one example, the one or more features may be roles that are associated with sender names in a sender field 226, and recipient names in a recipient field 228, the CC field 222 or the BCC field 224. In one embodiment, a company directory stored in the DB 106, as described above, can be used to identify the roles of associated with each name.

For example, the roles of each name may help define what business process is being executed. For example, if the roles of each name are a sales vice president and individual sales representatives, the business process may be a sales meeting. In another example, if the roles of each name are a customer and sales representative, the business process may be a sales transaction. In yet another example, if the roles of each name are technicians and an engineer the business method may be a product development meeting, and so forth.

In one embodiment, the process detector may analyze the text within the email 112 and identify the business process based on the roles using a logistic regression model. In one embodiment, the logistic regression model may be optimized to identify the business process, the logistic regression model may by defined by Equation (1) below:

$$P(p \mid m_{1:}; \theta) = \frac{e^{\theta^T \varphi(p, m_{1:})}}{\sum_{p' \in P} e^{\theta^T \varphi(p, m_{1:})}}, \quad \text{Equation (1)}$$

where P is a business process that is identified based upon a given process p and a message thread prefix $m_{1:}$ from a training data set of pre-defined business processes and associated features that are known and stored in the DB 106. In addition, θ is a vector of a learned parameters from a thread of the emails, T, used to train the model and φ is a fixed dimension feature vector function of the given process p and the message thread prefix $m_{1:}$.

In one embodiment, θ may be optimized using a stochastic gradient descent (SGD) approach over a $L_2$-regularized log-loss assuming a training set D of (process, thread prefix) pairs using Equation (2) below:

$$L_\theta(D) = \sum_{(p; m_{1:}) \in D} \log P(p \mid m_{1:}; \theta) + C \|\theta\|_2^2, \quad \text{Equation (2)}$$

where C is a regularization hyper-parameter estimated by cross-validation.

Once the business process is identified, one or more activities and/or one or more variable associated with each activity may be identified. In one embodiment, the DB 106 may store the activities and the associated variables for each activity of a known business process. The BPAS 104 may then automatically analyze the emails 112 to identify the activities and variables associated with each activity in the emails 112. The BPAS 104 may then compare the identified activities and variables identified in the emails 112 to the activities and variables that should be included for the known business process. If any variable is incorrect, missing, and the like, the BPAS 104 may determine that an error is detected in the business process.

In one embodiment, the BPAS 104 may identify the activities and variables associated with each activity by analyzing the text within the emails 112. In one example, the analysis may be performed by defining the problem as an entity recognition problem and deploying a conditional random field (CRF) model for a word-label sequence v of the message $m_i$ of an email thread m. In other words, the problem can be defined as a sequence tagging problem where a sequence of words that correspond to an activity or a variable are tagged or labeled.

In theory it may be natural to estimate the probability of the detected variable set in a message via Equation (3) below:

$$P(V \mid m_i; p) \propto \sum_{v \in V^{|m_i|}} P(v \mid m_i; p), \quad \text{Equation (3)}$$

However, the sum may be substituted by its most probable term as shown by Equation (4) below:

$$P(V \mid m_i; p) \propto \max_{v \in V^{|m_i|}} P(v \mid m_i; p), \quad \text{Equation (4)}$$

In one embodiment, the probability of the labeling sequence using a CRF may be defined by first evaluating the labeling sequence via a scoring function defined by Equation (5) below:

$$s(v \mid m_i, p; \lambda) = \sum_{l=1}^{|m_i|} \sum_{j=1}^{J} \lambda_j f_j(w_{il}, l, v_l, v_{l-1}, p), \quad \text{Equation (5)}$$

wherein λ is a learned parameter, w is a word in the email 112 and f( ) are input features. In one embodiment, $w_t$ may be the word at position t, $T_t$ may be a part of speech tag at a position t, w may range over all words in the training data set and T may range over all part of speech tags defined by an example language data set (e.g., the CONLL 2009 dataset).

In one embodiment, the input features may be based on a variety of different features associated with $w_t$. Table 1 below describes example features that may be associated with $w_t$.

TABLE 1

| Example Input Features |
|---|
| $w_t - \delta = w$ (e.g., does the word $w_t$ match a feature where the word before the current position $w_t$ is w); |
| $w_t$ matches [A-Z][a-z]+ (e.g., does the word $w_t$ match a feature of having the first letter capitalized and not the other letters?); |
| $w_t$ matches [A-Z] (e.g., does the word $w_t$ match a feature of having all capital letters?); |
| $w_t$ matches [A-Z] + [a-z] + [A-Z] + [a-z] (e.g., does the word $w_t$ match a feature of having a sequence of a capital letter, a lower case letter, a capital letter, a lower case letter, and so forth?); |
| $w_t$ matches *[0-9].* (e.g., does the word $w_t$ match a feature of having numbers?); |
| $w_t$ appears in a list of first names, last names, company names, days, months, or geographic entities; |
| $w_t$ is contained in a lexicon of words with part of speech tag (e.g., from Senna tagger) $f_k(x, t + \delta)$ for all k and $\delta \in \{-3, \ldots, 3\}$; |

With a λ set of parameters to learn and $f_j(.)$ a defined set of J feature functions (e.g., see Table 1), and then pushing a score from Equation (5) through a sigmoid function that yields a probability of labelling of a message $m_i$ given by Equation (6) below:

$$P(v \mid m_{1:}; \theta) = \frac{e^{s(v \mid m_i, p; \lambda)}}{\sum_{v'} e^{s(v' \mid m_i, p; \lambda)}}, \quad \text{Equation (6)}$$

for learning the parameters λ, a training set D of sequence labeled messages may be assumed and the parameters λ that maximize the conditional log-likelihood of label sequences given by Equation (7) below may be found:

$$L_\lambda(D) = \sum_{(v; m) \in D} \log P(v_i \mid m_i, p; \lambda), \quad \text{Equation (7)}$$

In practices, the optimization task of Equation (7) may also be conducted using SGD methods similar to those used with Equation (2) above.

It should be noted that Equations (1)-(7) provide only one mathematical solution to how the business process may be identified based on text in the emails 112 and how the activities and variables can be identified based on the text in the emails 112. In other words, other mathematical solutions may exist to perform the functions of the present disclosure and the examples provided herein should not be considered limiting.

As noted above, the activities and the associated variable values of the activities found in the text may be compared to the known activities and associated variable values of a known business process to determine if an error is detected. For example, if the variable values associated with a business process identified in the email 112 is different than the variable values of the know business process, then an error may be detected. In another example, if there are five variables associated with a known business process, but only four variables are detected in the email 112, then an error may be detected.

In one embodiment, the errors may be related to role anomalies, information anomalies or workflow anomalies. For example, role anomalies may include errors related to having the wrong users performing a particular role, a thread of emails 112 missing a user that performs a particular role, and the like. In other words, the thread of emails 112 associated with a particular business process may be missing certain roles and the users associated with those roles.

In one embodiment, the information anomalies may include wrong or missing values for certain variables associated with an activity or the activity may be missing altogether. For example, the business process of a business meeting may include variables of a meeting date and time. The email 112 may include a date, but may be missing a time. In another example, the email 112 may include a data and time, but may be missing information associated with a variable of location that is also a variable associated with the business process of business meeting. In yet another example, the business process may be an off-site business meeting. The email 112 may include a date, time and location. However, the business process of off-site business meeting may also include the activity of travel reservations and the email 112 may be missing travel reservations activities (e.g., reserving a flight ticket, reserving a hotel room, reserving a rental car, and the like).

In one embodiment, a workflow anomaly may include a sequence of activities that have occurred in an incorrect or wrong chronological order. The workflow anomalies may also include extra activities or wrong activities within a sequence of a business process that may indicate inefficiencies or redundancies in a business process. For example, for the business process of a sales transaction, the business process may include a sequence of activities that include receive order, receive payment, ship order. However, if activities identified in the email 112 occur in a sequence of receive order, ship order, receive payment, an error may be detected.

In one embodiment, when the error is detected, the BPAS 104 may automatically generate the alert email 114. The alert email 114 may request a correction to the at least one variable to complete the business process. In one example, the variable may also be an activity.

In one embodiment, the alert email 114 may be addressed automatically to all parties that are part of the emails 112 and transmitted to the respective endpoint devices $110_1$ to $110_n$ as shown by dashed lines $120_1$ to $120_n$. In one embodiment, the alert email 112 may be automatically generated and addressed only to a user that has a particular role that would be responsible for providing the correct information for the at least one variable that caused the error. In another embodiment, the BPAS 104 may automatically generate the alert email 114 and include an address of parties that may be missing (e.g., a role anomaly is detected). For example, the BAPS 104 may use a company directory stored in the DB 106 that includes email addresses of employees and his or her associated roles, as described above.

In one embodiment, the alert email 112 may also include recommendations. For example, if information is missing for a particular variable, the alert email 112 may provide suggestions or recommendations for the particular variable causing the error to complete the business process. To illustrate, if the variable of hotel reservations was missing for a business process of off-site business meeting, the alert email 112 may notify the users that hotel reservations need to be completed and may include recommendations for hotels (e.g., based on company preferences, lowest cost, and the like) near the location of the off-site business meeting.

As a result, the present system 100 may automatically monitor email threads and analyze the text in the email threads to detect an error in a business process. The system 100 may allow users to continue to exchange emails without any additional steps to include the email address of the BPAS 104. In other words, the system 100 may be integrated seamlessly with existing email systems.

Figure 3:
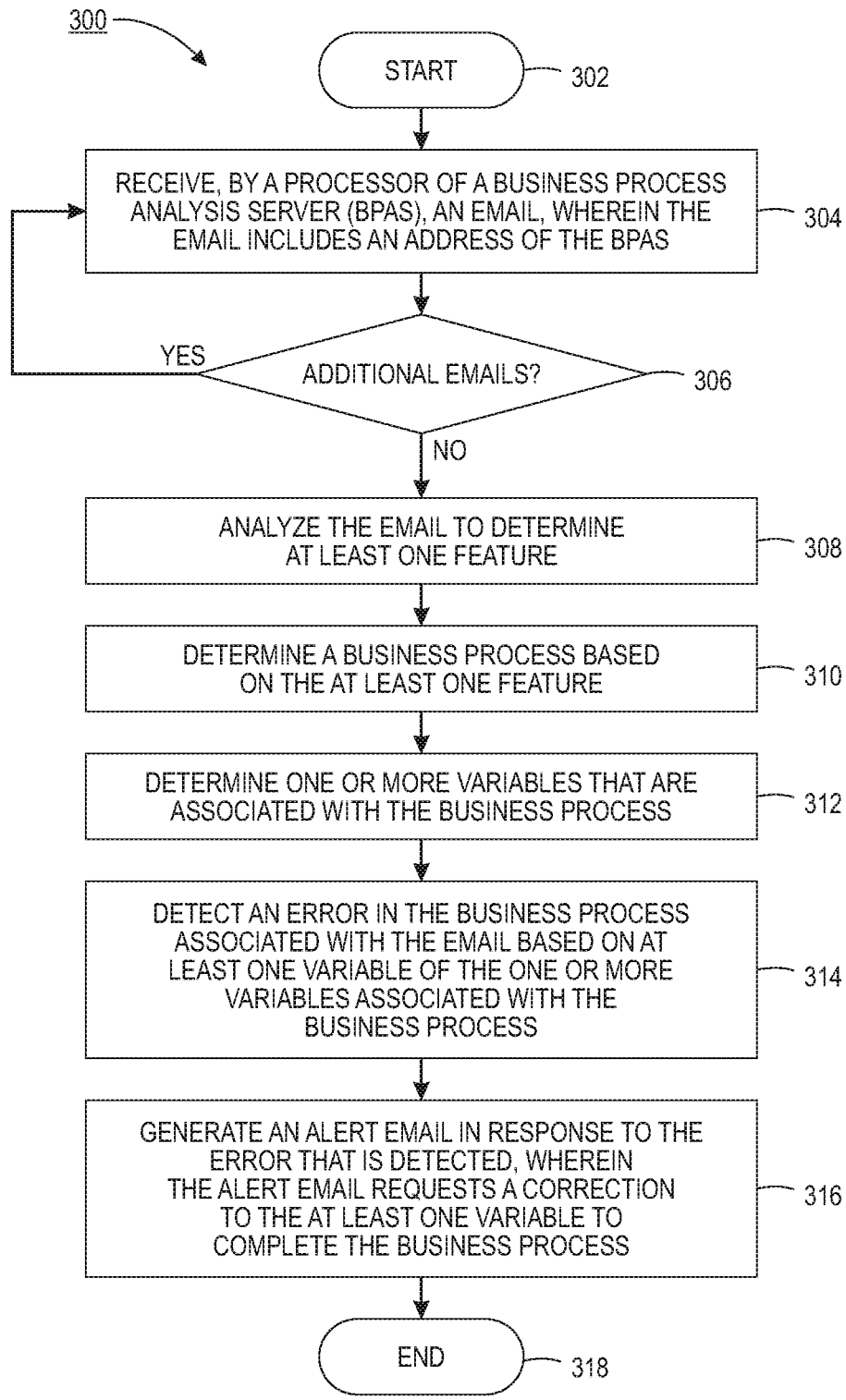
FIG. 3 illustrates a flowchart of an example method for detecting an error in a business process via an exchange of email messages.
Figure 4:
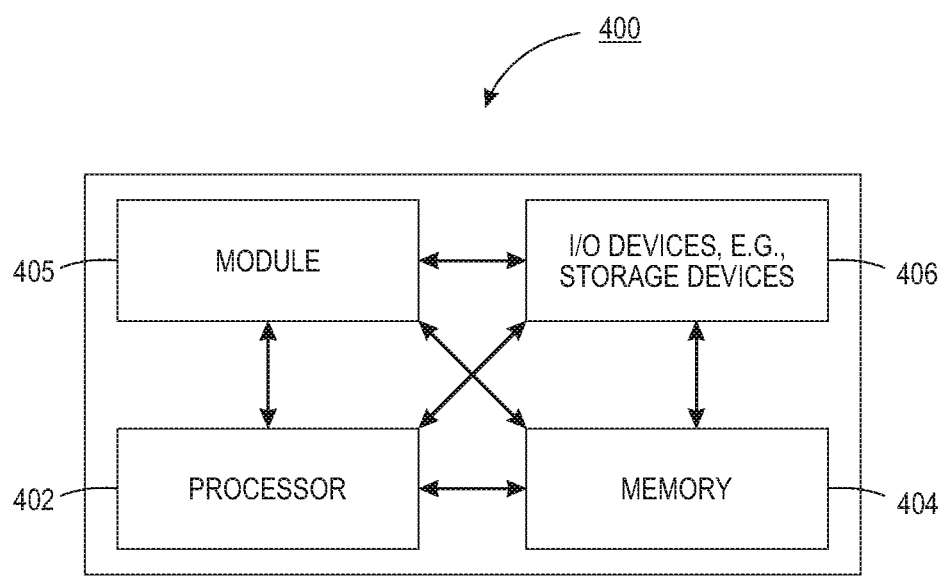
FIG. 4 illustrates an example high-level block diagram of a computer suitable for use in performing the functions described herein.

FIG. 3 illustrates a flowchart of an example method 300 for detecting an error in a business process via an exchange of email messages. In one embodiment, one or more steps or operations of the method 300 may be performed by a processor of the BPAS 104 illustrated in FIG. 1 or a computer as illustrated in FIG. 4 and discussed below.

At block 302, the method 300 begins. At block 304, the method 300 receives an email, wherein the email includes an address of the BPAS. In one embodiment, the address may be automatically included when the email is generated by an email application of a sending endpoint device. For example, the email address of the BPAS may be included in a CC field or a BCC field of the email automatically when the sending endpoint device creates a new email.

In another embodiment, the email address may be added by an email exchange server. For example, every email that is generated and routed through a communication network may be re-routed by an email exchange server. The email exchanger server may address every email to the BPAS for analysis. The emails may be analyzed before being forwarded to the recipient or may be copied to send a copy to the BPAS for analysis and the original email to the recipient.

At block 306, the method 300 may determine if additional emails are included in a thread of email messages. If the answer to block 306 is yes and additional emails exist, the method may return to block 304 and receive the additional emails until all emails have been received. However, if the answer to block 306 is no, then the method 300 may proceed to block 308. It should be noted that the blocks 308-312 below may be performed for each email if more than one email is received.

At block 308, the method 300 may analyze the email to determine at least one feature. For example, the features may include names of senders and recipients of the email and associated roles for each participant. For example, the roles may be found based on a company directory that may be stored in a database. In one embodiment, a natural language processor may be used to analyze the text in the email to identify the features.

At block 310, the method 300 may determine a business process based on the at least one feature. For example, a training dataset may be used to define a business process based on roles of users or participants identified in an email. In one embodiment, Equations (1) and (2) described above may be used by the BPAS to automatically identify the business process based on the email. However, it should be noted that other mathematical solutions may also be deployed and that Equations (1) and (2) are provided only as examples.

At block 312, the method 300 may determine one or more variables that are associated with the business process. For example, once the business process is determined, a database may have known business processes that identify variables that are associated with the business process. In one embodiment, the variables may include a party, an activity, a duration, a progress of the business process, a location, a date, a time, a chronological order, and the like.

In one embodiment, Equations (2)-(7) described above may be used to determine the one or more variables based on the text in the email. It should be noted that other mathematical solutions may also be deployed and that Equations (2)-(7) are provided only as examples.

At block 314, the method 300 may detect an error in the business process associated with the email based on at least one variable of the one or more variables associated with the business process. For example, the known business processes may be associated with a respective set of variables. The variables identified in the email may be compared to the respective set of variables that are associated with the known business process. Based on the comparison, it may be apparent that some variables are missing or the values of some variables are incorrect. In one embodiment, the comparison may reveal role anomalies, information anomalies or workflow anomalies, as described above. When one of the above anomalies is detected, the BPAS may detect that an error has occurred based on at least one of the variables associated with the business process.

At block 316, the method 300 may generate an alert email in response to the error that is detected, wherein the alert email requests a correction to the at least one variable to complete the business process. In one embodiment, the alert email may be addressed to those users that are already a part of the email or emails of an email thread. In another embodiment, the alert email may include additional address of users that have a role that are missing from the email or emails of the email thread. In other words, the BPAS may automatically include additional email addresses to the alert email to request the correction.

In one embodiment, the correction may include requesting a value associated with the at least one variable that is missing. In another embodiment, the correction may include requesting a correction to a value of the at least one variable that is incorrect. In one embodiment, the alert email may include recommendations along with the request. For example, the recommendations may include values for the at least one variable that can be used to complete the business process correctly. At block 318, the method 300 ends.

It should be noted that although not explicitly specified, one or more steps, functions, or operations of the method 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps, blocks or operations in FIG. 3 that recite a determining operation or involve a decision do not necessarily require that both branches of the determining operation be practiced. In other words, one of the branches of the determining operation can be deemed as an optional step. In addition, one or more steps, blocks, functions or operations of the above described method 300 may comprise optional steps, or can be combined, separated, and/or performed in a different order from that described above, without departing from the example embodiments of the present disclosure.

FIG. 4 depicts a high-level block diagram of a computer that is dedicated to perform the functions described herein. As depicted in FIG. 4, the computer 400 comprises one or more hardware processor elements 402 (e.g., a central processing unit (CPU), a microprocessor, or a multi-core processor), a memory 404, e.g., random access memory (RAM) and/or read only memory (ROM), a module 405 for detecting an error in a business process via an exchange of email messages, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 405 for detecting an error in a business process via an exchange of email messages (e.g., a software program comprising computer-executable instructions) can be loaded into memory 404 and executed by hardware processor element 402 to implement the steps, functions or operations as discussed above in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for detecting an error in a business process via an exchange of email messages (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for detecting an error in a business process via an exchange of email messages, comprising:

receiving, by a processor of a business process analysis server (BPAS) that receives all email messages for analysis, an email, wherein the email includes an address of the BPAS that is automatically added to each email that is created at an endpoint device of a user and a recipient email address when the email is created at the endpoint device, wherein the address of the BPAS is included in a carbon copy field or a blind carbon copy field of the email;

analyzing, by the processor, the email to determine at least one feature, wherein the at least one feature comprises a keyword within text from the email and a role associated with each email address in the email found from a company directory;

determining, by the processor, the business process based on the role associated with each email address and the keyword within the text in the email using a logistic regression model, the logistic regression model comprising, $$P(p \mid m_{1:}; \theta) = \frac{e^{\theta^T \varphi(p, m_{1:})}}{\sum_{p' \in P} e^{\theta^T \varphi(p, m_{1:})}},$$

where P is a business process that is identified based upon a given process p and a message thread prefix $m_{1:}$ from a training data set of pre-defined business processes and associated features that are known, $\theta$ is a vector of learned parameters from a thread of the emails, T, used to train the logistic regression model and, $\varphi$ is a fixed dimension feature vector function of the given process p and the message thread prefix $m_{1:}$;

determining, by the processor, one or more variables that is associated with activities associated with the business process based on analysis of the text within the email, wherein the analysis deploys a conditional random field model for a word-label sequence of the email of an email thread;

detecting, by the processor, the error in the business process associated with the email based on at least one variable of the one or more variables associated with the business process, wherein the error comprises at least one of: a role anomaly, an information anomaly or a workflow anomaly, wherein the detecting comprises:

comparing, by the processor, the activities and values of the one or more variables of the activities of the business process to known activities and associated variables of the business process; and determining, by the processor, that a value of the at least one variable of the one or more variables of the activities is different than a value of a corresponding variable of the associated variables of the known activities; and generating, by the processor, an alert email in response to the error that is detected, wherein the alert email requests a correction to the at least one variable to complete the business process, wherein the alert email is generated by the BPAS and addressed only to a user that has a particular role that is responsible for providing correct information for the at least one variable that caused the error in the business process, wherein the user is missing from a thread of emails associated with the business process.

2. The method of claim 1, wherein the at least one feature comprises a plurality of features.

3. The method of claim 2, wherein the business process is determined based on a comparison of the plurality of features to a set of features associated with each one of a plurality pre-determined business processes stored in a database in communication with the BPAS.

4. The method of claim 1, wherein the one or more variables comprises at least one of: a party, an activity, a duration or a progress.

5. The method of claim 1, wherein the error comprises that the at least one variable is missing.

6. The method of claim 1, wherein the error comprises that the at least one variable is incorrect.

7. A non-transitory computer-readable medium storing a plurality of instructions, which when executed by a processor of a business process analysis server (BPAS), causes the processor to perform operations for detecting an error in a business process via an exchange of email messages comprising:

receiving an email, wherein the email includes an address of the BPAS that is automatically added to each email that is created at an endpoint device of a user and a recipient email address, wherein the BPAS receives all email messages for analysis when the email is created at the endpoint device, wherein the address of the BPAS is included in a carbon copy field or a blind carbon copy field of the email;

analyzing the email to determine at least one feature, wherein the at least one feature comprises a keyword within text from the email and a role associated with each email address in the email found from a company directory;

determining the business process based on the role associated with each email address and the keyword within the text in the email using a logistic regression model, the logistic regression model comprising, $$P(p \mid m_{1:}; \theta) = \frac{e^{\theta^T \varphi(p, m_{1:})}}{\sum_{p' \in P} e^{\theta^T \varphi(p, m_{1:})}},$$

where P is a business process that is identified based upon a given process p and a message thread prefix $m_{1:}$ from a training data set of pre-defined business processes and associated features that are known, $\theta$ is a vector of learned parameters from a thread of the emails, T, used to train the logistic regression model and, φ is a fixed dimension feature vector function of the given process p and the message thread prefix $m_{1:}$;

determining one or more variables that is associated with activities associated with the business process based on analysis of the text within the email, wherein the analysis deploys a conditional random field model for a word-label sequence of the email of an email thread;

detecting the error in the business process associated with the email based on at least one variable of the one or more variables associated with the business process, wherein the error comprises at least one of: a role anomaly, an information anomaly or a workflow anomaly, wherein the detecting comprises:
- comparing the activities and values of the one or more variables of the activities of the business process to known activities and associated variables of the business process; and
- determining that a value of the at least one variable of the one or more variables of the activities is different than a value of a corresponding variable of the associated variables of the known activities; and generating an alert email in response to the error that is detected, wherein the alert email requests a correction to the at least one variable to complete the business process, wherein the alert email is generated by the BPAS and addressed only to a user that has a particular role that is responsible for providing correct information for the at least one variable that caused the error in the business process, wherein the user is missing from a thread of emails associated with the business process.

8. The non-transitory computer-readable medium of claim 7, wherein the at least one feature comprises a plurality of features.

9. The non-transitory computer-readable medium of claim 8, wherein the business process is determined based on a comparison of the plurality of features to a set of features associated with each one of a plurality pre-determined business processes stored in a database in communication with the BPAS.

10. The non-transitory computer-readable medium of claim 7, wherein the one or more variables comprises at least one of: a party, an activity, a duration or a progress.

11. The non-transitory computer-readable medium of claim 7, wherein the error comprises that the at least one variable is missing.

12. The non-transitory computer-readable medium of claim 7, wherein the error comprises that the at least one variable is incorrect.

* * * * *